Patented Jan. 20, 1942

2,270,718

UNITED STATES PATENT OFFICE 2,270,718

ARTICLE OF VITREOUS QUARTZ AND PROCESS FOR PRODUCING AND WORKING IT

Franz Skaupy, Berlin-Lichterfelde-West, and Gustav Weissenberg, Berlin-Mariendorf, Germany No Drawing. Application December 17, 1937, Serial No. 180,408. In Germany December 19, 1936

10 Claims. (Cl. 49—78.1)

The present invention relates to articles of vitreous quartz and to a process for producing and working them.

It is possible to produce articles of vitreous quartz either by fusing the quartz or by heating the raw material at such a temperature only that the quartz merely sinters. The first method, e. g., the so-called Bottomley process, is not suitable for the mass production of quartz articles.

When quartz is sintered there exists the danger of cristobalite being formed. The formation of cristobalite will considerably impair the quality of the articles made of vitreous quartz.

The present invention consists in producing articles of sintered, wholly vitreous quartz not containing a considerable amount of cristobalite.

It is well known that silica exists in numerous modifications. There are stable: at 526° C. the so-called α-quartz, between 526° and 870° C. β-quartz, and between 870° and 1470° C. tridymite, the latter existing in three modifications, viz. α-tridymite, β-tridymite, and γ-tridymite. Then above 1470° C. there is the stable region of cristobalite existing in the two forms of α-cristobalite and β-cristobalite. The fusion point of cristobalite is 1710° C. Whereas in producing articles of vitreous quartz by fusion the quartz is heated beyond the fusion temperature of cristobalite, in the sintering of quartz the temperature of 1710° C. is not exceeded at all or at most for a short time only. This causes cristobalite once formed not to disappear again. The temperature range of 1470° to 1710° C. is, however, the danger zone in which the formation of cristobalite is particularly enhanced. Therefore, a further feature of the invention is so to produce articles of vitreous quartz that the heating operation is controlled in such a way that any lengthy stay within the region of cristobalite formation (1470° to 1710° C.) is avoided. In most cases it is an advantage not to extend the staying within the temperature range in question over 15 minutes. Articles of vitreous quartz produced according to this method are free from any large quantities of cristobalite and, hence, are superior to other articles produced from sintered quartz in their mechanical, thermal and electrical characteristics, being equal to the best products obtained by the more complicated and more expensive fusion process.

In some cases it may be desirable to still increase the density of the surface of the vitreous quartz articles produced by the sintering method according to the invention. This is secured, according to the invention, by raising the temperature to above 1700° for a few minutes immediately after the actual sintering operation. This causes the quartz to fuse at the surface of the products, whereby the density of the surface is still increased.

In producing articles of vitreous quartz the danger of changes of shape, particularly by shrinkage, arises. According to the invention shrinkage of articles of vitreous quartz during sintering may be avoided by accurately controlling the size of grain of the powdered quartz from which the molded articles are produced, while adding, if necessary, a binder such as a solution of tragacanth or cellulose ester. If the proportion of the comparatively coarse grained powdered quartz is taken at not less than 25%, practically no shrinkage occurs on sintering. In some cases, however, an addition of 10% of coarse grained powdered quartz will be sufficient. By comparatively coarse grained we mean a powdered quartz of a size of grain exceeding .3 mm. The aforementioned property of preventing shrinkage is influenced to a certain degree by the origin of the quartz also. Spanish quartzite which has a size of grain of between .3 and .5 mm., has proved to be particularly effective in preventing shrinkage during the sintering of articles of vitreous quartz.

Articles of vitreous quartz made exclusively of coarse grained powdered quartz exhibit the property of swelling instead of shrinkage of the surface during sintering. Care must therefore be taken that the ground quartz used in the production of articles of vitreous quartz shall not consist exclusively of quartz grains of larger diameter. The maximum content of coarse grained powdered quartz should not exceed 30%.

The articles of sintered vitreous quartz are molded generally prior to the sintering operation. The powdered quartz serving as raw material is molded by hand or by other shaping operations customary in the ceramic industry, preferably while using a plasticizer.

Fine details in molding may be obtained by means of cutting tools, e. g., by boring, turning, milling, grinding, filing, or sawing, the working by cutting tools being carried out with the molded articles which have only been dried and not yet sintered, or with the molded articles which have already been preliminarily sintered. The preliminary sintering is effected preferably at a temperature between 900° and 1400° C., i. e. below the range of cristobalite formation.

Another method of shaping consists in pressing the sintered shaped bodies while hot. In that case the sintered shaped bodies of vitreous quartz, from which the pressed articles are produced, have approximately the same weight as the pressed articles themselves. The pressing operation which takes only a few seconds is carried out preferably at about 1600° C. Edges resulting from the pressing may be removed by grinding.

A further possible way of shaping consists in placing on a combustible carrier substance a thin layer of powdered quartz rendered plastic with a binder. On being heated to the sintering temperature the carrier substance is burnt, and a hollow, thin-walled body is thus produced. Particularly suitable carrier substances are paper, cellulose, and cardboard. The carrier substance must be of such a nature that it burns without residue. Powdered quartz which preferably has been rendered plastic by the use of a binder may be applied to the carrier material by means of a spraying gun. According to this embodiment of the invention hollow bodies of a wall thickness of less than 1 mm. can be produced without difficulties.

The following method is employed for producing large articles of vitreous quartz, more particularly large hollow bodies:

In the first place there are produced normal constructional elements of a size easily to be manufactured, for example, plane or curved plates. The desired hollow bodies are then assembled from a large number of such elements, being joined together by welding at the joints. Thus a small number of different elements will be sufficient to produce large articles, even of a complicated structure. Welding may be effected by the butt welding or by the seam welding method. The welding agent employed in this case is quartz again. According to this method the production of large hollow bodies of vitreous quartz is rendered possible without difficulties.

Finally it is possible to insert into the articles of vitreous quartz according to the invention shaped bodies of other high melting substances such as high melting metals, e. g., platinum metals or highly refractory oxides. The insertion of these substances into the powdered quartz rendered plastic with a binder is effected by the application of pressure or by other suitable means, before the molded articles are sintered.

If it is desired to insert into articles of vitreous quartz parts of a highly refractory oxide having a higher sintering temperature than quartz, it is necessary for the sintering of these highly refractory oxides to have been previously effected in a separate operation. If conversely a material is used that has a sintering temperature lower than that of quartz it is necessary first to sinter the quartz and to heat the complete article to this lower sintering temperature after the insertion of the parts made of the oxide sintering at a lower temperature. If the quartz and the other highly refractory oxide employed have approximately the same sintering temperature, sintering may be effected together.

If it is required to produce articles of vitreous quartz which contain vacuumtight wires of tungsten, molybdenum, or tantalum, it is preferable first to coat the tungsten, molybdenum, or tantalum wire with a thin layer of a metal of the platinum group. A platinized tungsten, molybdenum or tantalum wire holds fast and vacuumtight in articles of vitreous quartz.

Furthermore, the articles of vitreous quartz according to this invention may be colored, and this coloring of articles of vitreous quartz forms part of the present invention. Coloring may be effected by means of metals dissolving colloidally in the vitreous quartz. For this purpose there are used metal salts whose acid residues volatilize at the sintering temperature of quartz and whose primarily formed metal oxides decompose while oxygen is given off. For example, the salts of cobalt and nickel may be employed. Possibly the quartz forms with the oxides of these metals compounds colored per se, so that decomposition of the metal oxides, to form metals dissolving colloidally in the sintered quartz, is not a necessary condition for the formation of the color.

Particularly efficient colorings are obtained by using the lower oxides of those metals whose stable higher oxides form a colorless or slightly colored acid anhydride. Such compounds are, for example, the lower oxides of the metals titanium, cerium, zirconium, vanadium, niobium, tantalum, molybdenum, tungsten, and rhenium. The lower oxides of these metals are obtained by adding to the stable higher oxides of the aforementioned metals a reducing agent such as stannous oxide or ferrous oxide. At the sintering temperature of quartz reduction of the oxides of the aforementioned metals will occur to a certain extent, even without special reducing agents being added. When using titanium oxide, for example, desirable blue colorings will be obtained, even without special reducing agents being added.

The amount of coloring oxides required is small. Such an admixture does not impair at all, or hardly impairs, the valuable properties of quartz, e. g., in the first place, its stability against changes of temperature.

Another special mode of carrying out the coloring according to the invention of articles of vitreous quartz consists in first producing a highly concentrated coloring body from comparatively large quantities of the coloring oxides and small quantities of quartz. By means of this concentrated coloring body, further quantities of vitreous quartz can then be colored.

The articles of vitreous quartz according to the invention exhibit excellent chemical and mechanical resistability and remarkable electric insulating properties. The articles of vitreous quartz according to the invention can be worked to form the most varied industrial products, and not being more expensive than porcelainware or other ceramic products they can be used wherever porcelainware or other ceramic products have hitherto been used. As compared with porcelainware and other ceramic products, the products according to the invention are remarkable for their greater resistability to changes of temperature. Hence, the products according to the invention may be used to advantage for the manufacture of baking, frying, and cooking utensils.

The invention may be modified in various respects. Its manifold applications are illustrated by the following examples which, in their entirety, form part of the present invention. These examples, however, are not to be considered as limitations.

In the first place the invention relates to those products which entirely consist of vitreous quartz only. The addition of small amounts of alkali oxides, however, does not widen the scope of the present invention. The said addition of small amounts of alkali oxides does not considerably impair the chemical and physical properties of vitreous quartz, i. e., its remarkable stability against changes of temperature and its high resistance to chemical corrosion. By adding small amounts of alkali oxides, the sintering temperature, however, is lowered which in certain cases proves to be an advantage.

Example 1

Powdered crystalline quartz of a degree of purity of 99.8% $SiO_2$ is pressed into a mold and the pressed articles are placed in a furnace at a temperature of 1500° C. The temperature of the furnace during 8 minutes is increased to 1650° C. and kept at that height for 2 minutes. Then the parts are immediately removed from the furnace and can be allowed to cool in the air. Parts treated in this manner are completely sintered, i. e., they consist of vitreous quartz throughout.

Example 2

Shaped bodies of the same composition as described in Example 1 were placed in the furnace at a temperature of 1500° C. The temperature within 10 minutes was gradually increased to ca. 1720° C. The shaped bodies after being removed from the furnace exhibited a surface consisting of a vitreous, extremely dense layer of fused quartz.

Example 3

In order to produce articles of a complicated shape, for example, articles having an alternation of convex and concave parts, or articles containing bores of different axes, the shaping is preferably carried out by first pressing powdered quartz into a mold, thus producing an article of a shape approaching the final shape of the product. This molded body, after drying or after a preliminary sintering operation, is subjected to machining by cutting tools. In this manner the desired final shape is produced. As the next step, the sintering process or, in the case of a preliminary sintering operation, the final sintering process, respectively, is carried out at ca. 1650° C.

In order to produce in a simple manner a hyperboloid which otherwise would require a complicated press mold, the following method is employed:

Using quartz-sand of 99.8% there is produced a cylindrically shaped body which during 15 minutes is subjected to a preliminary sintering operation at 1420° to 1450° C. The pre-sintered shaped body has sufficient strength to be worked by turning, or filing by hand, into the desired hyperboloid. The sintering of the parts worked in this manner is then finished as described in Example 1 or 2.

Example 4

The warm pressing of pre-sintered shaped bodies into products of vitreous quartz is carried out while using a shaped body of about the same weight as the pressed articles. The pressing is effected at a temperature of ca. 1600° C. Care has to be taken that during the pressing the losses of heat are not too big. This is accomplished by so designing the press mold that the channels are as short as possible. The small thermal conductivity of quartz further assists in preventing the losses of heat during the short duration of the flowing operation from becoming too big.

The device employed for the pressing is the usual die casting machine. By means of the pressing process articles of the most varied shape can be produced from vitreous, sintered quartz at a low price.

Example 5

In the production of complicated articles it is to be preferred to plastify the quartz powder by means of a binding agent. As suitable binding agents there may be employed organic compounds which will burn without residue. An eventual ash residue of the binding agents would enhance the formation of cristobalite and, thus, cause unfavorable effects.

Solutions of cellulose derivatives in organic solvents have proved to be particularly suitable binding agents. As an example, the solutions of purified film waste in isoamylacetate may be named.

12.5 gr. of finely chipped film waste are dissolved in 200 g. of commercial iso-amylacetate. 27 cc. of this solution are admixed with 100 g. of powdered quartz containing 99.8% $SiO_2$ and comprising the following sizes of grain:

| | | Per cent |
|---|---|---|
| .3 | mm | 14.4 |
| .3 –.15 | mm | 41.6 |
| .15 –.12 | mm | 7.4 |
| .12 –.088 | mm | 14.6 |
| .088–.075 | mm | 8.8 |
| –.075 | mm | 12.8 |
| | | 99.6 |

This mixture is extremely plastic, approximating clay, and can be worked by hand into bodies of any desired shape. The shaped bodies are then dried either at room temperature for 1 to 3 days (depending on the wall thickness), or in a ventilated drying chamber at 40° to 50° C. After being dried they are relatively strong and can be machined. When dry these parts in particular can be worked by cutting tools. The finished parts then are heated at 600° to 800° C. for ca., 20 minutes in order to evaporate the solvents completely, and are sintered as described in Example 1 or 2.

Example 6

100 g. of the powdered quartz employed in Example 5 are admixed with 10 cc. of binder solution and kneaded thoroughly. The plastified mixture which is still crumbly is pressed by slight pressure into shaped bodies which are dried and machined. Again to avoid too complicated press molds, for example, in the manufacture of a vessel with long spout, vessel and spout are pressed and dried separately, whereupon the spout is stuck to the vessel by means of a thin paste of powdered quartz and binder. Then, the parts are subjected to the final sintering process in the usual manner. The interfaces of spout and vessel will sinter together forming a firm and absolutely tight joint.

Example 7

In order to produce articles of vitreous, sintered quartz containing a vacuumtight insertion of tungsten, we proceed in the following manner: The tungsten wire or rod is first provided with a very thin coating of platinum, for example, electrolytically, with a view to avoiding the formation of tungstic acid while heating at the sintering temperature. While inserting the tungsten wire or rod, the shaped body is then produced from quartz powder, preferably using a binder, and sintered in the usual manner. The tungsten wire or rod proves to form a firm and vacuumtight joint with the quartz.

Example 8

To produce spinnerets for the artificial silk industry, short straight platinum pins of ca. .3 mm. are inserted into a freshly shaped, still plastic sheet made according to Example 4, whereupon the whole is dried and sintered. The platinum pins are subsequently bored open in the usual manner.

Example 9

Another embodiment of the invention consists in producing thin plates or hollow articles by placing or spraying a comparatively thin mixture of powdered quartz and binder solution on a combustible base. After drying, sintering is effected. During the sintering operation the base is burnt, and the hollow article or the plate remains in a sintered condition. Plates for condensers of a thickness of .5 mm., for example, are produced in the following manner:

A mixture of 100 g. of powdered quartz and 50 cc. of binder solution is spread on paper with a spatula in a layer of adequate thickness. The paper and the mass are dried and then sintered, as described in the preceeding examples, the paper burning without residue while a very regular, translucent, vitreous plate remains.

Example 10

A hollow piece having a wall thickness of .3 mm. is produced in the following manner:

100 to 150 cc. of binder solution are employed for 100 g. of powdered quartz. This material is sprayed, by means of a spraying gun, onto an adequately shaped cardboard body. Then the whole is dried and treated as described in Example 9.

Example 11

A very useful embodiment of the invention consists in pressing or otherwise shaping, with or without addition of a binder, and subsequently sintering a vitreous instead of a crystalline material. Hence, the temperature at which the shaped bodies can be sintered, is much lower, inasmuch as during the actual sintering process no transformation of crystalline into vitreous quartz has to take place, but merely the joining of the vitreous parts. The technical advantage of this mode of carrying out the invention resides in the fact that thin-walled parts during the sintering process cannot readily lose their shape, because a temperature may be used which does not readily impair the ability of quartz to retain its shape.

Powdered quartz, e. g., in the form of rods is continuously sintered by drawing it through a furnace. The quartz bars are broken up by edge-rollers and ground in a ball mill to form a powder comprising the desired sizes of grain. Of this powdered vitreous quartz shaped bodies are made, as described in the preceding examples, and sintered at 1500° C. When a pre-sintering operation is to be carried out, the temperature ought to be 1000° to 1400° C.

Example 12

The shrinkage of the shaped bodies which occurs during the sintering process, can be controlled to a wide extent by various measures. It has been found that when a very coarse grained crystalline material is used, a swelling, i. e., a negative shrinkage will occur which is due to air bubbles enclosed as a rule, and which has to be avoided, of course. In case of a very finely ground material the probability of air bubbles occurring is greatly diminished, and there is no swelling effect when powdered quartz of a small size of grain is used.

The natural shrinkage occurring during the sintering process which lies between 3 and 12%, varying with the shape to be given and with the distribution of the sizes of grain, can be very accurately regulated by adding coarse grained powdered quartz producing a certain swelling effect, to a material exhibiting a certain shrinkage.

Powdered quartz made from Pyrenees quartzite and having a size of grain of over .3 mm. will on sintering give a swelling effect which may amount to 20%. Shaped bodies containing not more than 30% of the coarse grained powdered quartz do not show this swelling. On the contrary, the usual shrinkage is compensated with them, so that they do not undergo any change of shape during sintering.

Example 13

When using powdered quartz from Hohenbrocka (Saxony) for shaped bodies produced according to Example 4, a most regular shrinkage of 8% occurs. In order to reduce this shrinkage to 3%, there are added to the powdered quartz 25% of Pyrenees quartzite of a size of grain of .5 to .3 mm.

Example 14

The excellent stability of the products according to the present invention against changes of temperature—they can readily be chilled in cold water after being heated to 1600° C.—is not impaired by addition of small amounts of alkali oxides.

Powdered quartz to which 2% by weight of an alkali oxide, for example, sodium oxide in form of sodium carbonate have been admixed, is subjected to the sintering process described in Example 10. The sintered material is then broken up and ground, the powdered quartz thus obtained is shaped and the shaped bodies are sintered at 1400° to 1450° C. The stability against changes of temperature is practically the same as that of pure quartz.

Example 15

The coloring of vitreous quartz can be effected by means of colloidally dispersed metals or by means of metal compounds, particularly metal oxides. For the coloring with metals there are preferably used metal salts which contain an easily volatile acid residue, and whose primarily formed metal oxides either leave a metal dissolving colloidally in the silica while giving off oxygen, or give a colored silicate with the silica. Such salts are, for example, the nitrates of cobalt and nickel. Certain nitrides, such as zirconium and titanium nitride, likewise impart beautiful colorings to the sintered quartz.

The coloring with metal oxides is preferably applied to highly refractory oxides. Such oxides give particularly beautiful effects, chiefly when complete or partial reduction to a lower degree of oxidation is effected.

The colorings which may be obtained can be inferred from the following examples:

(a) 100 g. of powdered quartz are admixed with 10 g. of cobalt nitrate dissolved in water. Then the material is sintered, broken up and ground again, mixed with another portion of powdered quartz and plastified. The shaped bodies are then produced and sintered, their color changing into a deep blue. The stability against changes of temperature is practically the same as that of non-colored quartz.

(b) 100 g. of powdered quartz are mixed with 5 g. of titanium oxide, the mixture then being plastified, shaped, and sintered in the usual manner. A blue color is thus obtained.

(c) 100 g. of powdered quartz are mixed with 2 g. of nickel nitrate and 8 g. of cobalt nitrate dissolved in water. The shaped bodies are then pressed and sintered in the usual manner. The color obtained is gray to brownish-blue.

(d) A mixture of, e. g., 10% $TiO_2$ and 90% powdered quartz is reduced in a current of hydrogen at ca. 1200° C. and the resulting colored body is pulverized. In the manufacture of shaped quartz bodies according to one of the embodiments described above, a small amount of the aforementioned colored body is admixed with the powdered quartz yielding blue colored quartz bodies.

*Example 16*

The articles produced according to the above process can readily be welded without being divitrified. A special field of application of the process and its embodiments, viz., the production of large bodies, chiefly hollow bodies, depends on the good welding properties of the material. A preferably used embodiment of the invention consists in assembling the bodies, i. e., hollow bodies from constructional elements of a size easily to be manufactured, the joints of said elements being welded together. A seam welding process can preferably be used, choosing as welding rod a quartz rod which is made of the same material as the constructional elements to be sintered.

This method is illustrated by the following data:

(a) A rectangular vat shall be produced from quartz. As constructional elements there are sintered sheets of 25 cm. by 25 cm. by .5 cm., the edges of said sheets being provided with facets at an angle of 30°. The sheets are joined together and the edges are welded by means of a quartz rod of the same material and an oxyhydrogen blowpipe. Preferably the rod as well as the hollows formed by the facets are heated simultaneously, the quartz rod being pressed into the hollow when fusion begins.

(b) Instead of welding with a quartz rod, seam welding can be employed. Plastified powdered quartz is spread over the hollow-shaped welding-point. After drying, the powdered quartz is fused by an oxyhydrogen blowpipe, and the viscous mass is pressed into the joint by a steel spatula.

If we refer to a "sintering process' in our claims we specifically mean any sintering process as described in the foregoing paragraphs, by means of which any essential formation of cristobalite is prevented.

What we claim is:

1. A process for the manufacture of products of vitreous sintered quartz, comprising the steps of heating said products at sintering temperature, and keeping the products during the sintering operation within the critical temperature range of 1470° C. to 1710° C. for a short period of time up to about 15 minutes to avoid the formation of cristobalite.

2. A process for the manufacture of products of vitreous sintered quartz, comprising the steps of heating said products at sintering temperature, keeping the products during the sintering operation within the critical temperature range of 1470° C. to 1710° C. for a short period of time, and subsequently heating said products to a temperature above 1700° C. for a short time which will be sufficient for fusing the surface only, the total time of heating above about 1470° C. being up to about 15 minutes to avoid the formation of cristobalite.

3. A process for the manufacture of products of vitreous sintered quartz, comprising the steps of using as raw material for said products powdered quartz containing up to 30% of powdered quartz of a size of grain above .3 mm, heating said products at sintering temperature, and keeping the products during the sintering operation within the critical temperature range of 1470° C. to 1710° C. for a short period of time up to about 15 minutes to avoid the formation of cristobalite.

4. A process for the manufacture of products of vitreous sintered quartz, comprising the steps of forming shaped products of powdered quartz, inserting high melting shaped bodies into said shaped products, subsequently heating said products at sintering temperature, and keeping the products during the sintering operation within the critical temperature range of 1470° C. to 1710° C. for a short period of time up to about 15 minutes to allow the formation of tridymite and avoid the formation of cristobalite.

5. A process for the manufacture of products of vitreous sintered quartz, comprising the steps of forming shaped products of powdered quartz containing up to 30% of powdered quartz of a size of grain above .3 mm., inserting high melting shaped bodies into said shaped products, subsequently heating said products at sintering temperature, and keeping the products during the sintering operation within the critical temperature range of 1470° C. to 1710° C. for a short period of time up to about 15 minutes to avoid the formation of cristobalite.

6. As a new article of manufacture a coherent unitary product consisting essentially of finely divided quartz, sintered without fusion to form a unitary article, containing vitreous quartz, substantially free from cristobalite.

7. As a new article of manufacture a coherent unitary product consisting essentially of finely divided quartz, sintered without fusion to form a unitary article, containing vitreous quartz, substantially free from cristobalite, and having a surface layer of fused quartz.

8. As a new article of manufacture a coherent unitary product consisting essentially of finely divided quartz, sintered without fusion to form a unitary article, containing vitreous quartz, substantially free from cristobalite, having an insertion of a high melting point body embedded in and united with said product.

9. As a new article of manufacture a coherent unitary product consisting essentially of finely divided quartz, sintered without fusion to form a unitary article, containing vitreous quartz, substantially free from cristobalite, having an insertion of a high melting point metal embedded in and united with said product.

10. As a new article of manufacture a coherent unitary product consisting essentially of finely divided quartz, sintered without fusion to form a unitary article, containing vitreous quartz, substantially free from cristobalite, having an insertion of a high melting point body embedded in and united with said product, said body being solid at the sintering temperature of quartz.

FRANZ SKAUPY.
GUSTAV WEISSENBERG.